United States Patent
Yang et al.

(10) Patent No.: US 10,855,192 B1
(45) Date of Patent: Dec. 1, 2020

(54) VOLTAGE SLEW RATE LIMITERS FOR TRANSFORMER-BASED SWITCHING POWER CONVERTERS

(71) Applicant: Apple Inc., Cupertino, CA (US)

(72) Inventors: Zaohong Yang, Plano, TX (US); Marco A. Davila, Jr., Spicewood, TX (US); Joao L. Andres, Austin, TX (US); Poornima Mazumdar, Austin, TX (US); Bogdan T. Bucheru, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/538,963

(22) Filed: Aug. 13, 2019

(51) Int. Cl.
*H02M 3/335* (2006.01)
*H02M 1/00* (2006.01)

(52) U.S. Cl.
CPC ..... *H02M 3/33569* (2013.01); *H02M 1/0061* (2013.01); *H02M 3/33507* (2013.01); *H02M 2001/0003* (2013.01)

(58) Field of Classification Search
None
See application file for complete search history.

(56) References Cited

U.S. PATENT DOCUMENTS

| | | | |
|---|---|---|---|
| 6,169,671 B1* | 1/2001 | Mao | H02M 1/34 363/126 |
| 9,933,801 B1* | 4/2018 | Guan | G05F 1/575 |
| 2002/0079944 A1* | 6/2002 | Sander | H03K 17/0822 327/309 |
| 2003/0025483 A1* | 2/2003 | Neidlinger | H05B 41/2825 323/288 |
| 2006/0109691 A1* | 5/2006 | Strijker | H02M 1/32 363/1 |
| 2007/0263415 A1* | 11/2007 | Jansen | H02M 3/33569 363/21.03 |
| 2018/0062529 A1* | 3/2018 | Song | H02M 3/33507 |

* cited by examiner

*Primary Examiner* — Jeffrey A Gblende
(74) *Attorney, Agent, or Firm* — Blank Rome LLP

(57) ABSTRACT

A transformer-based switching power converter can include a slew rate limiter coupled to the switching stage and configured to limit rate of change of voltage across one or more switching devices of the switching stage, thereby reducing voltage spikes appearing on the secondary winding. The slew rate limiter may be configured to selectively operate to limit rate of change of voltage across one or more switching devices of the switching stage during startup of the switching stage, upon waking from burst mode, or at any time when zero voltage switching of the one or more switching devices is unavailable. The slew rate limiter can include at least one circuit element configured to selectively alter a time constant of a gate drive circuit of at least one switching device in the switching stage to increase a turn-on transition time of the at least one switching device.

21 Claims, 4 Drawing Sheets

_US 10,855,192 B1_

VOLTAGE SLEW RATE LIMITERS FOR TRANSFORMER-BASED SWITCHING POWER CONVERTERS

BACKGROUND

Many modern electronic devices rely on switching power converters to change an input voltage into an output voltage suitable for a load connected to the power converter. Various types of such switching converters may also include a transformer between the input and output, and many of these converters may also include a rectifier coupled between the transformer secondary and the load. FIG. 1A illustrates a generic block diagram of such a converter. An input voltage Vin may be switched by a switching stage 102 to develop a primary voltage Vpri that is applied to the primary winding of transformer 104. The switching stage may take a variety of forms depending on the particular converter type, including a single switch, a pair of switches in a high-low configuration, a half-bridge, a full bridge, multi-phase configurations, etc. Transformer 104 may convert the primary voltage Vpri to a secondary voltage Vsec in accordance with the turns ratio of the transformer. This secondary voltage may be rectified by a rectifier 106 to produce output voltage Vout. Rectifier 106 may take a variety of forms, including passive rectification devices, such as diodes, or active/synchronous rectification circuits employing switching devices such as transistors or silicon controlled rectifiers.

One issue that can arise with such circuits is voltage spikes on the secondary. More specifically, rectifier 106 may include a parasitic capacitance that can form a resonant circuit with the leakage inductance of transformer 104. This resonant circuit may respond to switching transients associated with operation of switching stage 102 to produce a ringing voltage on the secondary, as discussed in greater detail below. This ringing voltage may include brief voltage spikes substantially higher than the nominal operating voltage of the secondary. These voltage spikes may result in damage to rectifier 106 unless the rectifier element(s) is (are) chosen to have a sufficiently high voltage rating. Unfortunately, higher voltage ratings of the rectifier elements may be associated with higher costs, lower efficiency, slower response, and other undesirable effects. Thus, what is needed in the art are circuits and techniques for mitigating the voltage spikes.

SUMMARY

A power converter can include a transformer and a switching stage coupled between an input of the power converter and a primary winding of the transformer. The switching stage may be configured to receive an input voltage and deliver a primary voltage to the primary winding of the transformer. The power converter can further include a rectifier stage coupled between an output of the power converter and a secondary winding of the transformer. The rectifier stage may be configured to generate a DC voltage from an AC voltage at the secondary winding. The power converter can further include a slew rate limiter coupled to the switching stage and configured to limit rate of change of voltage across one or more switching devices of the switching stage, thereby reducing voltage spikes appearing on the secondary winding.

The slew rate limiter may be configured to selectively operate to limit rate of change of voltage across one or more switching devices of the switching stage during startup of the switching stage. The power converter switching stage may include one or more switching devices configured for zero voltage switching in normal operation, in which case the slew rate limiter may be configured to selectively operate to limit rate of change of voltage across one or more switching devices of the switching stage when zero voltage switching is unavailable. The slew rate limiter can include at least one circuit element configured to selectively alter a time constant of a gate drive circuit of at least one switching device in the switching stage to increase a turn-on transition time of the at least one switching device. The at least one circuit element may be a capacitor coupled to the at least one switching device. The at least one circuit element may be a capacitor coupled to an auxiliary winding of the transformer.

A slew rate limiting circuit for a transformer-based switching power converter can include a capacitor configured to be coupled between a first terminal and a drive terminal of a switching device; of the power converter. The slew rate limiting circuit can further a semiconductor device coupled between the drive terminal and the capacitor. The capacitor and the semiconductor device may be configured to selectively limit a voltage slew rate across the first and second terminals of the switching device.

The semiconductor device may be a first diode. In that case, the capacitor may be configured to change a time constant of a gate drive circuit of the at least one switching device to increase a turn-on transition time of the at least one switching device. In this arrangement, the at least one switching device may be a MOSFET, the first terminal may be a drain of the MOSFET, and the drive terminal may be a gate of the MOSFET. The first diode may have an anode coupled to the gate of the MOSFET and a cathode coupled to the capacitor. The slew rate limiting circuit can further include a second diode having an anode coupled to the cathode of the first diode and a cathode configured to be coupled to a bias supply of the transformer-based switching power converter. The slew rate limiting circuit can further include a third diode having an anode coupled to a source of the MOSFET and a cathode coupled to the cathode of the first diode.

The semiconductor device may be a second switching device. In that case, the at least one switching device may be a MOSFET, the first terminal may be a drain of the MOSFET, and the drive terminal may be a gate of the MOSFET. The second switching device may have a first terminal configured to be coupled to a gate driver of the switching power converter, a second terminal configured to be coupled to the gate of the MOSFET, and a drive terminal configured to be coupled to the capacitor. The slew rate limiting circuit may further include a resistor coupled between the drive terminal of the second switching device and a gate drive circuit, wherein the resistor changes a time constant of a gate drive circuit of the at least one switching device to increase a turn-on transition time of the at least one switching device. The slew rate limiting circuit can further include a diode having an anode coupled to the drive terminal of the second switching device and a cathode configured to be coupled to a bias supply of the transformer-based switching power converter. The slew rate limiting circuit can further include a third diode having an anode coupled to a source of the MOSFET and a cathode coupled to the drive terminal of the second switching device.

A power converter can include a transformer having a primary winding and a secondary winding. The power converter can further include a switching stage comprising at least one switching device configured to selectively couple an input voltage of the power converter to the primary winding of the transformer. The power converter can further include a rectifier stage comprising at least one rectifier device configured to couple the secondary winding of the transformer to an output of the power converter. The power converter can further include a slew rate limiting circuit coupled to the at least one switching device and configured to limit a rate of change of voltage across the at least one switching device, thereby reducing voltage spikes on the secondary winding.

The slew rate limiting circuit can include a capacitor configured to change a time constant of a gate drive circuit of the at least one switching device to increase a turn-on transition time of the at least one switching device. The capacitor may be coupled to an auxiliary winding of the transformer. The capacitor may be a Miller capacitor. The capacitor is coupled to a gate of the at least one switching device by a diode. The capacitor may be coupled to a gate of the at least one switching device by a second switching device having a first terminal coupled to a gate drive circuit, a second terminal coupled to a gate of the at least one switching device, and a drive terminal coupled to the capacitor. A resistor may be coupled between the first and second terminals of the second switching device. The resistor may be configured to change a time constant of a gate drive circuit of the at least one switching device to increase a turn-on transition time of the at least one switching device.

DETAILED DESCRIPTION

Figure 1A:
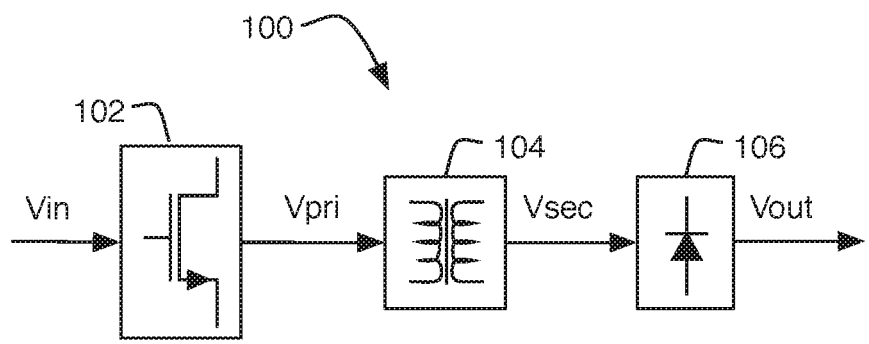
FIG. 1A depicts a block diagram of a transformer-based switching power converter.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

Figure 1B:
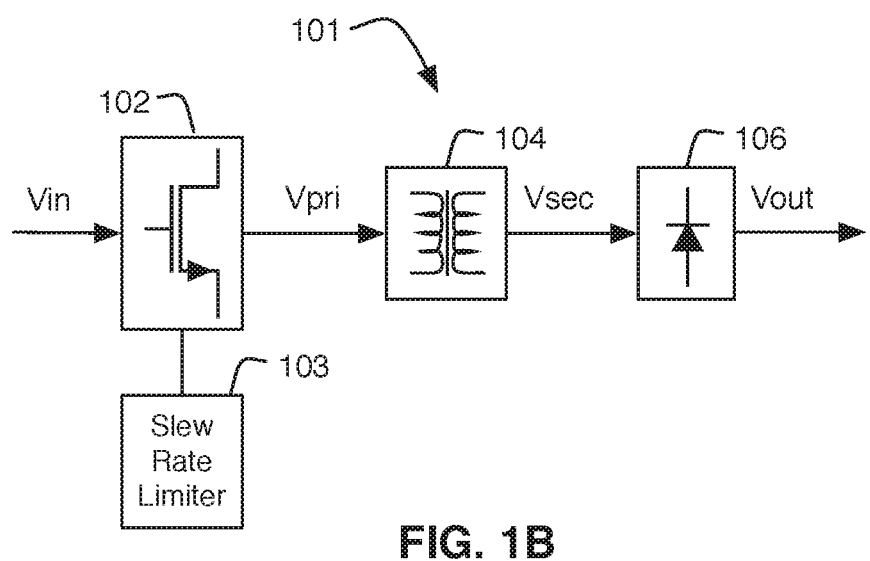
FIG. 1B depicts a block diagram of a transformer-based switching power converter incorporating a slew rate limiter for the primary switching stage.

Disclosed herein are various embodiments for reducing the magnitude of voltage spikes appearing on the secondary of a transformer-based switching power converter. As illustrated in FIG. 1B, a converter 101 may achieve the desired voltage spike magnitude reduction by applying a slew rate limiter 103 (discussed in greater detail below) to limit the voltage slew rate of switching stage 102. Slew rate limiter 103 may reduce the voltage slew rate, i.e., the rate of change of voltage (dV/dt), across one or more switches making up switching stage 102. More specifically, the voltage slew rate may be limited so as to minimize the resonant peaks experienced on the secondary side. In some embodiments this may be achieved by limiting the voltage slew rate so that it is sufficiently slower than the time constant (or resonant frequency) of the secondary resonant circuit formed by the parasitic inductance of transformer 104 and rectifier 106. In other words, by knowing the approximate values of the parasitic inductances and capacitances associated with the secondary side circuit of converter 101, a voltage slew rate (dV/dt) may be selected to provide the desired degree of reduction in output voltage spikes.

Figure 2:
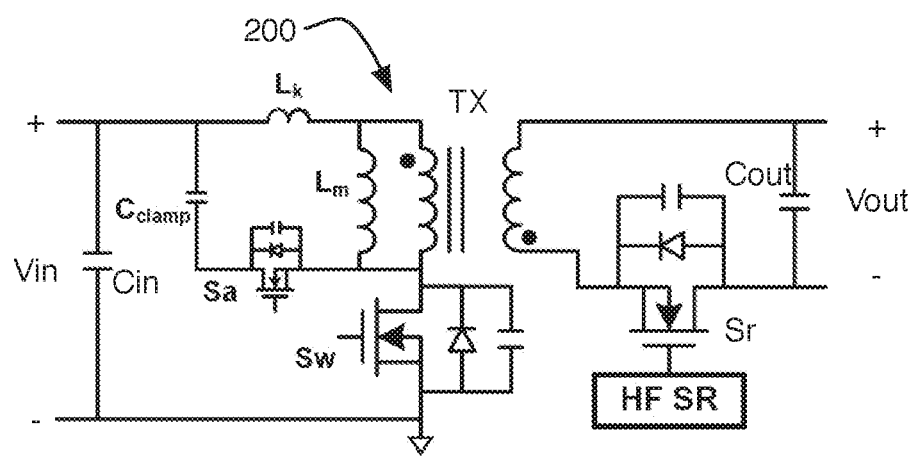
FIG. 2 depicts a schematic of an active clamp flyback converter.

These voltage slew rate limiting techniques may be applied to any type of transformer-based switching power converter. Such converters may include flyback converters, forward converters, LLC converters, and other converter types. In some embodiments, the transformer-based switching power converter may be an active clamp flyback converter 200 as illustrated in FIG. 2. Operation of such converters is known, and thus will be only briefly summarized here.

A DC input voltage Vin may be applied to the input of active clamp flyback converter 200. Input capacitor Cin may support this input voltage bus. A primary winding of transformer TX may be selectively coupled across input voltage Vin by a main switch Sw connected in series with the primary winding. (In FIG. 2, the primary winding is depicted separately from its associated leakage inductance Lk and magnetizing inductance Lm. Likewise, main switch Sw is depicted separately from its intrinsic body diode and drain to source capacitance.)

When main switch Sw is closed, current through the primary winding of transformer TX increases linearly. Secondary current is blocked from flowing by synchronous rectifier switch Sr. (In some embodiments, the rectifier may be a passive diode.) At a time determined by the secondary controller (not shown), main switch Sw is opened. This causes the voltage across the primary winding to reverse, which results in a secondary current flowing in a clockwise direction. This secondary current delivers energy to the load and also charges output capacitor Cout to maintain output voltage Vout. Synchronous rectifier switch may be closed during this period, thereby improving operating efficiency of the circuit.

At the same time, the primary current can no longer flow through opened main switch Sw. This current thus flows through auxiliary (or clamp) switch Sa, which may be turned on when main switch Sw is turned off. This allows clamp capacitor Cclamp to be charged with the leakage energy stored in transformer TX. After the energy stored in transformer TX has been delivered to the load, the cycle may repeat, with switch Sw closing again. At this point, the leakage energy stored in clamp capacitor Cclamp may be returned to the primary winding, thereby improving the overall efficiency of the circuit.

Figure 3:
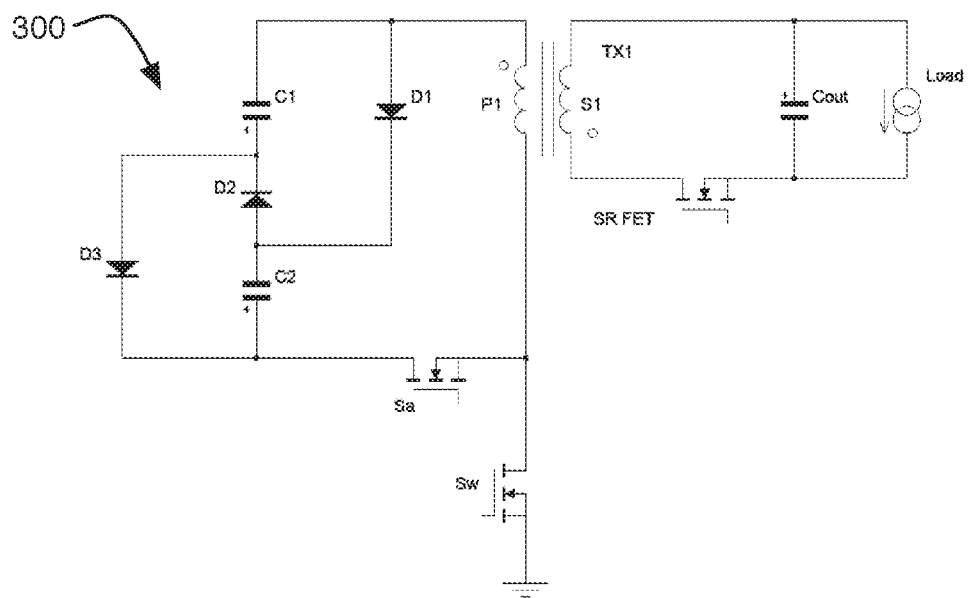
FIG. 3 depicts a schematic of a series-parallel active clamp flyback converter.

One embodiment of an active clamp flyback converter is series-parallel active clamp flyback converter 300 illustrated in FIG. 3. Series-parallel active clamp flyback converters are described in Applicant's U.S. Pat. No. 9,774,270, which is hereby incorporated by reference in its entirety. At a high level operation of series-parallel active clamp flyback converter 300 is generally similar to that described above with respect to the converter of FIG. 2. Main switch Sw alternately connects and disconnects primary winding P1 of transformer TX1 across an input voltage. When main switch Sw is conducting, no current flows through secondary winding S1 (because of synchronous rectifier SR FET), and energy is stored in transformer TX1. When main switch Sw opens, the voltage reversal across primary winding P1 causes a current flow through secondary winding S1, which may be rectified by synchronous rectifier SR FET. Likewise, when main switch Sw opens, the leakage energy stored in transformer TX1 may be delivered to the series-parallel clamp made up of capacitors C1 and C2 and diodes D1, D2, and D3. At a high level, capacitors C1 and C2 are charged in series (through diode D2), absorbing the leakage energy stored in transformer TX1. Thereafter, capacitors C1 and C2 discharge in parallel, through diodes D3 and D1, respectively, returning the leakage energy to transformer TX1. Further details of series-parallel clamp operation are not critical to the slew rate limiting circuits described herein, but may be found in the referenced '270 patent.

Figure 4:
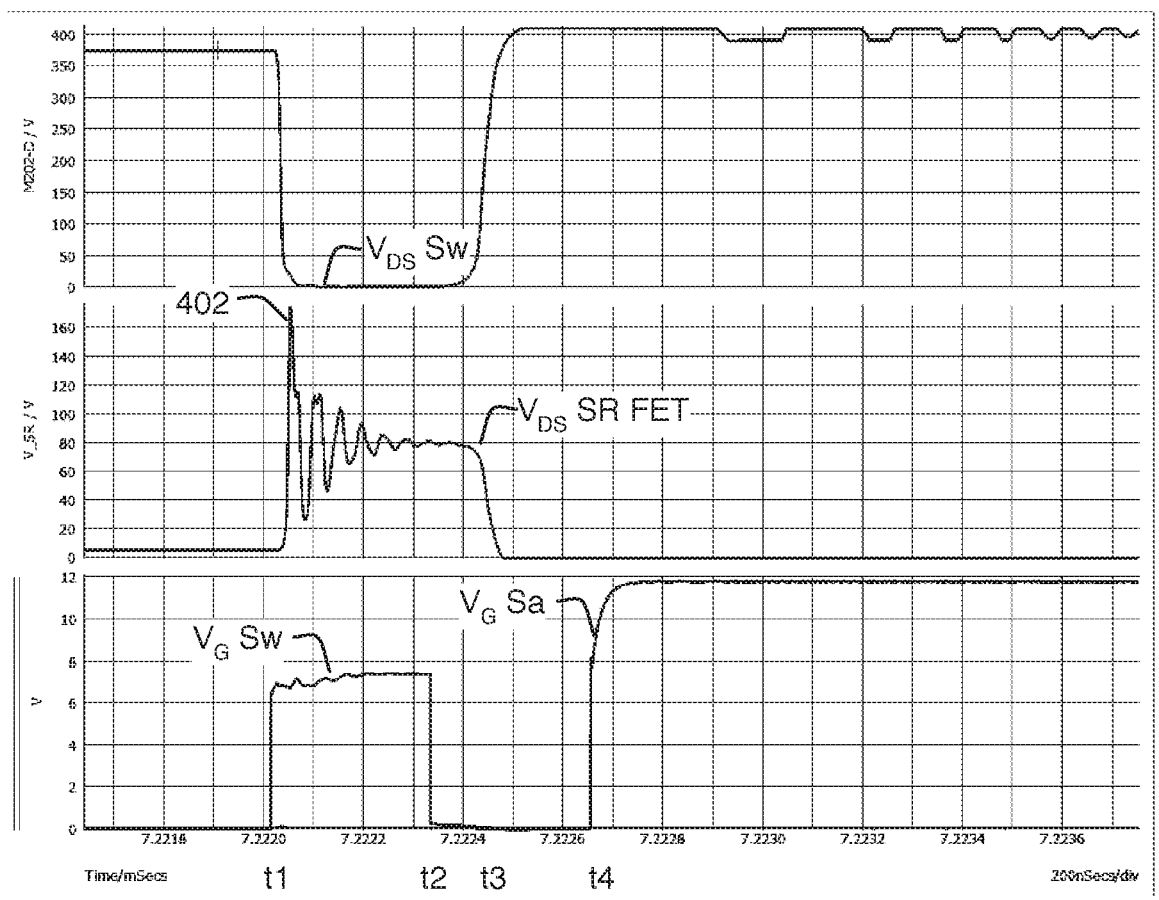
FIG. 4 depicts various waveforms of the series-parallel active clamp flyback converter of FIG. 3.

The switching operation of main switch Sw may cause a ringing voltage on the secondary side of transformer TX1 by virtue of the resonant circuit formed by the various secondary parasitics. This may be seen in FIG. 4, which illustrates various waveforms associated with the series-parallel clamp flyback converter of FIG. 3. Voltage trace VG Sw illustrates the gate voltage applied to main switch Sw by a controller (not shown). In the illustrated plots, main switch Sw is turned on at time t1, when voltage VG Sw rises from zero to a fairly constant value, and is turned off at time t2, when voltage VG Sw falls back to zero. Voltage trace VG Sa illustrates the gate voltage applied to auxiliary/clamp switch Sa by the controller (not shown). Auxiliary/clamp switch Sa is turned on at time t4 and is off prior to that.

Voltage trace VDS Sw represents the drain to source voltage across main switch Sw. This voltage starts at the DC bus voltage and drops to zero fairly rapidly at time t1 when the controller (not shown) applies the gate drive voltage to main switch Sw. Voltage VDS Sw thereafter remains at zero (corresponding to main switch Sw being on) until time t2, when main switch Sw is turned off. Voltage VDS Sw then increases from zero back to the DC bus voltage value over time interval t3 as the energy stored in transformer TX1 is discharged to the load and to the clamp circuit.

Voltage trace VDS SR FET represents the drain to source voltage across synchronous rectifier switch SR FET. This voltage starts at small non-zero value associated with the forward drop across the intrinsic body diode of the switch. Then, at time t1, when main switch Sw is turned on, the voltage increases rapidly oscillating about before ringing down to its steady state value. The first oscillation peak 402 may have a voltage that is twice the steady state value of the voltage. As noted above, this can either damage rectifier device SR FET or require selection of a device having a voltage rating higher than would otherwise be required, leading to the deleterious effects described above. In any event, voltage VDS SR FET begins decreasing at time t2, when main switch Sw is turned off. Voltage VDS SR FET decreases during time interval t3 while energy stored in transformer TX1 is discharged and current begins flowing in the secondary, reaching zero volts when SR FET is closed by a synchronous rectifier controller (not shown).

Rectifier voltage spike 402 may be adversely affected by a variety of parameters and operating conditions of converter 300. As noted above, this pulse is created by resonance in the secondary parasitics of the reflected voltage transient associated with the turn on of main switch Sw. Thus, the magnitude of the pulse will be greater in cases where the turn on transient of main switch Sw is greater. This can occur, for example, at startup of the converter. Additionally, this can occur when the converter is resuming switching after a period of time in burst mode. Depending on the particular implementation, these conditions can be worsened by the order in which main switch Sw and auxiliary/clamp switch Sa resume switching on startup or exiting the bust mode.

In general, the conditions that lead to excessive secondary voltage spikes may be associated with conditions in which zero voltage switching (ZVS) of main switch Sw cannot be achieved. Many ZVS converters use the previous cycle energy to start the ZVS transition of the next period. Because of energy efficiency requirements, the energy needed for the next ZVS transition may be minimized to reduce circulating current in many converters. As a result some ZVS converters may not produce large voltage spikes because of the already relatively slow slew rates. Yet, such converters may be susceptible to voltage spikes when there is no previous cycle available, and the first switch turned on must turn on with no ZVS transition. At startup, this may be the case because there is no energy stored in the magnetizing inductance of transformer TX1. Upon waking from bust mode, this may be the case because there is insufficient energy remaining in the magnetizing inductance to achieve full ZVS, although in many cases resuming from bust mode may result in "partial-ZVS" stitching. Partial-ZVS switching occurs when the switching transition is softened by reducing the voltage across the switch at the time of turn on, but in which there is insufficient energy available to bring the switches VDS voltage down to zero before the turn on event. In such cases, the magnitude of the secondary voltage spike may be reduced, but may still be of sufficient magnitude to cause damage or require a higher voltage rating of the rectifier device.

Figure 5:
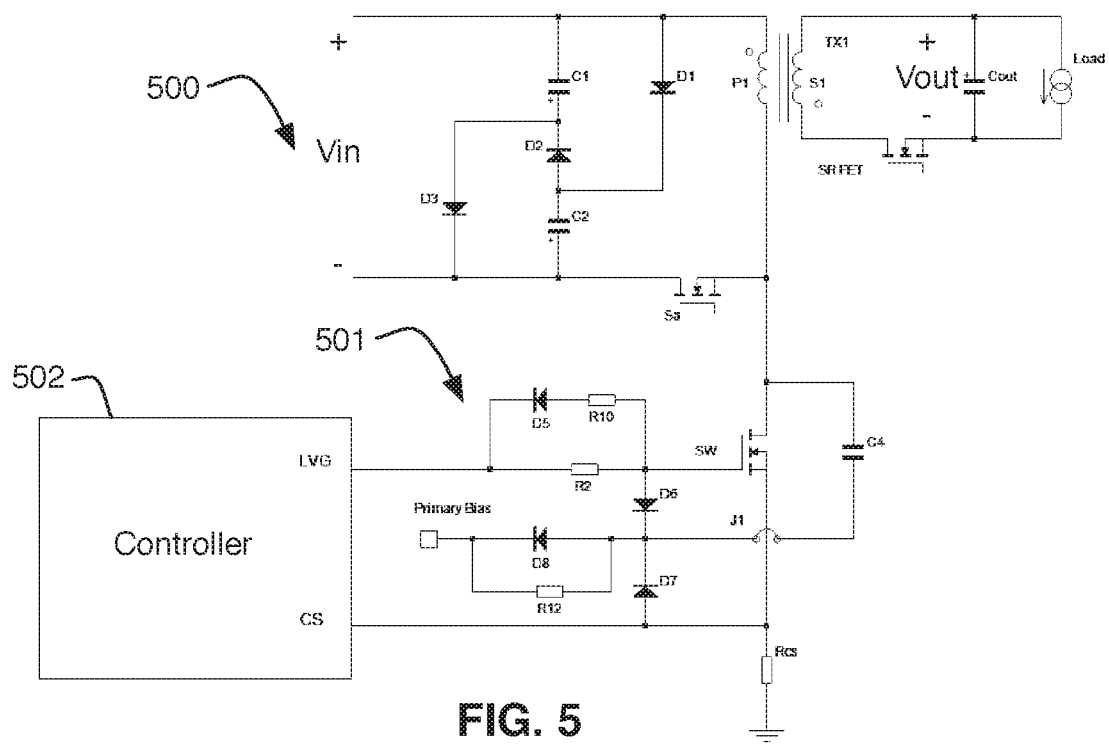
FIG. 5 depicts a converter with a slew rate limiting circuit.

Reduction of secondary voltage spike 402 may be achieved by slowing down the voltage transient associated with the closing of main switch Sw, which may be achieved by slowing down the turn on event itself. FIG. 5 illustrates a transformer-based switching converter 500 incorporating a slew rate limiting circuit 501 coupled between controller 502 and main switch Sw. In the illustrated embodiment, transformer-based switching converter 500 is a series-parallel active clamp flyback converter like that described above with respect to FIG. 3. However, it is to be appreciated that the principles to be discussed are also applicable to other transformer-based switching converters.

Main switch Sw may be operated by controller 502 to convert input voltage Vin to a regulated output voltage Vout for delivery to the load. Controller 502 may implement any suitable control scheme. In some embodiments, controller 502 may be a pulse width modulation (PWM) controller that adjusts the duty cycle and/or switching frequency of main switch Sw to regulate output voltage Vout. To control main switch Sw, controller 502 outputs a gate drive signal on terminal LVG ("low voltage gate"). Controller may also be connected to the source terminal main switch Sw via terminal CS. Controller 502 may also control auxiliary/clamp switch Sa via drive terminals (not shown). In other embodiments, the clamp may be controlled by a separate controller.

Low voltage gate drive terminal LVG is coupled to the gate of main switch Sw via resistor R2. Resistor R2 provides control of the turn on time in normal steady state operation. More specifically, resistor R2 and the gate capacitance form an RC circuit with an associated time constant that determines the turn on time. Low voltage gate drive terminal LVG is also coupled to the gate of main switch Sw via diode D5 and resistor R10. When gate drive terminal LVG is high (turning on main switch Sw), diode D5 is reverse biased, and resistor R10 has no effect. When gate drive terminal LVG is low (turning off main switch Sw), diode D5 becomes forward biased, and resistor R10 controls the steady state turn off time of main switch Sw. More specifically, resistor R10 and the gate capacitance forma n RC circuit with an associated time constant that determines the turn off time.

Because resistor R2 controls the turn on time of main switch Sw, one could select suitable values for R2 (based on the gate capacitance of main switch Sw) to increase the turn on transition time to suitably reduce the secondary voltage spikes. However, this would adversely affect the operating efficiency of the circuit unnecessarily, as during normal operation (i.e., non-startup/wake operation) main switch Sw may be operated in a ZVS condition. Thus, it may be preferable to provide a mechanism for limiting the turn on time only when the circuit is not otherwise being operated in a ZVS condition. In one embodiment, this may be achieved by adding a voltage slew rate limiting capacitor C4 to the circuit. Capacitor C4 may be coupled between the drain terminal of main switch Sw and the gate terminal of main switch Sw via diode D6. Thus, when a gate drive signal is asserted by controller 502, diode D6 is forward biased, and capacitor C4 is effectively coupled between the gate and drain of main switch Sw. Capacitor C4 thus acts as a Miller capacitor, in parallel with the inherent Miller capacitance of main switch Sw. As a result, the turn on transition of main switch Sw is slowed as a function of the R2-C4 time constant.

Figure 6:
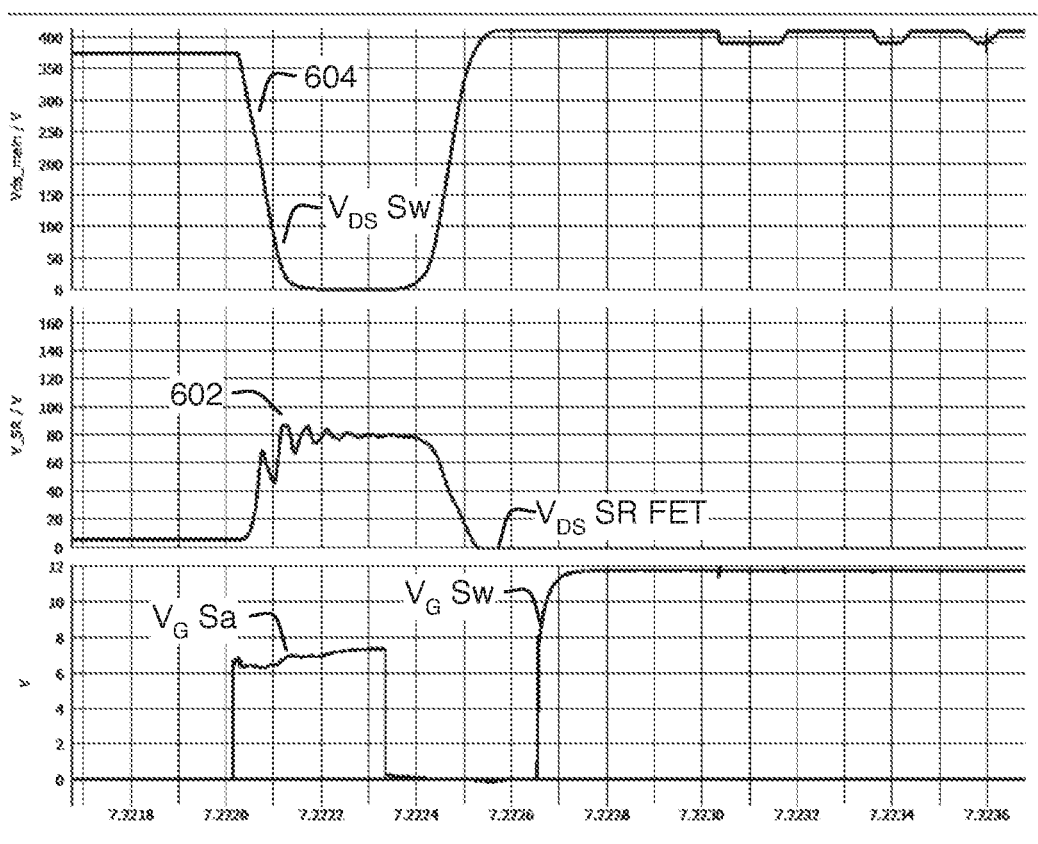
FIG. 6 depicts various waveforms of the converter with the slew rate limiting circuit of FIG. 5.

In other words, when main switch Sw's gate drive signal LVG is rising during the 1st switching cycle after startup/waking from bust mode, the drain voltage of main switch Sw will simultaneously decrease very quickly (i.e., high dv/dt). This may then pull the gate of main switch Sw to a lower potential (via C4 and D6) right above the turn on threshold. As a result, the main switch Sw operates in the Miller range long enough to slow down the transition from the OFF state to the ON state. This allows the drain to source voltage of main switch Sw (VDS Sw; FIG. 6) to gradually decrease. Because the main switch drain voltage VDS Sw decreases more slowly (than in the circuit of FIG. 3), the drain voltage of rectifier SR FET (VDS SR FET) will also rise more slowly. As a result, of this slower rise time, there is less effect from resonance of the secondary parasitics, and the magnitude of the secondary voltage spike 602 may be significantly reduced as compared to the circuit of FIG. 3.

As noted above, voltage slew rate limiting capacitor C4 may be coupled to the gate of main switch Sw by diode D6. Were this diode omitted, capacitor C4 would be connected directly to the gate of main switch Sw. As a result, the turn off transition of main switch Sw could also be slowed according to principles similar to those discussed above. However, this may not be desirable in at least some embodiments, hence the inclusion of diode D6. Additionally, although diode D6 is illustrated in FIG. 5 as a conventional diode, it may be desirable in at least some embodiments to provide a low voltage diode, such as a Schottky diode.

In addition to the voltage slew rate limiting capacitor C4, and diode D6 to limit its operation to turn on only, it may be desirable to provide a mechanism for resetting the slew rate limiting circuit. This may be achieved with a current path that allows capacitor C4 to charge/discharge in conjunction with the switching operation. This current path may be provided by diode D8, which couples the slew rate limiting capacitor C4 to the circuit's bias supply. As a result, energy stored in capacitor C4 may be returned to the bias supply during the turn off time when the drain voltage of main switch Sw is rising.

Finally, it may also be desirable to cause the slew rate limiting circuit to only affect the circuit during startup/wake operations. More accurately, it may be desirable to configure the slew rate limiting circuit so that it only affects operation when necessary. Diode D7, coupled between the source terminal of main switch Sw and slew rate limiting capacitor C4 ensures that during a zero voltage switching operation of Sw, the gate-coupled terminal of capacitor C4 cannot be pulled below the bias voltage by the zero voltage switching operation. As a result, when ZVS operation is present, slew rate limiting capacitor C4 will be already be charged to the bias voltage prior to the gate pulse. Thus, capacitor C4 will have no effect on the switching time of main switch Sw during normal steady state (ZVS) operation. (It will be appreciated that if the converter were configured without ZVS operation, then slew rate limiting capacitor C4 would be operable on all switching cycles.)

In some embodiments, a similar circuit may be constructed in which slew rate limiting capacitor C4 is coupled to an auxiliary winding of transformer TX1 rather than to the drain of main switch Sw. The operating principles of such a circuit are substantially similar to those described above. One difference with such a circuit is that the use of an auxiliary winding to charge slew rate limiting capacitor C4 (rather than primary winding P1) can allow for lower voltages across slew rate limiting capacitor C4. This can allow the use of a capacitor having a lower voltage rating. It will be appreciated that the capacitance value may need to be increased in such cases. Nonetheless, lower voltage rated capacitors, even with higher capacitance values may have a relative cost advantage for some embodiments.

Figure 7:
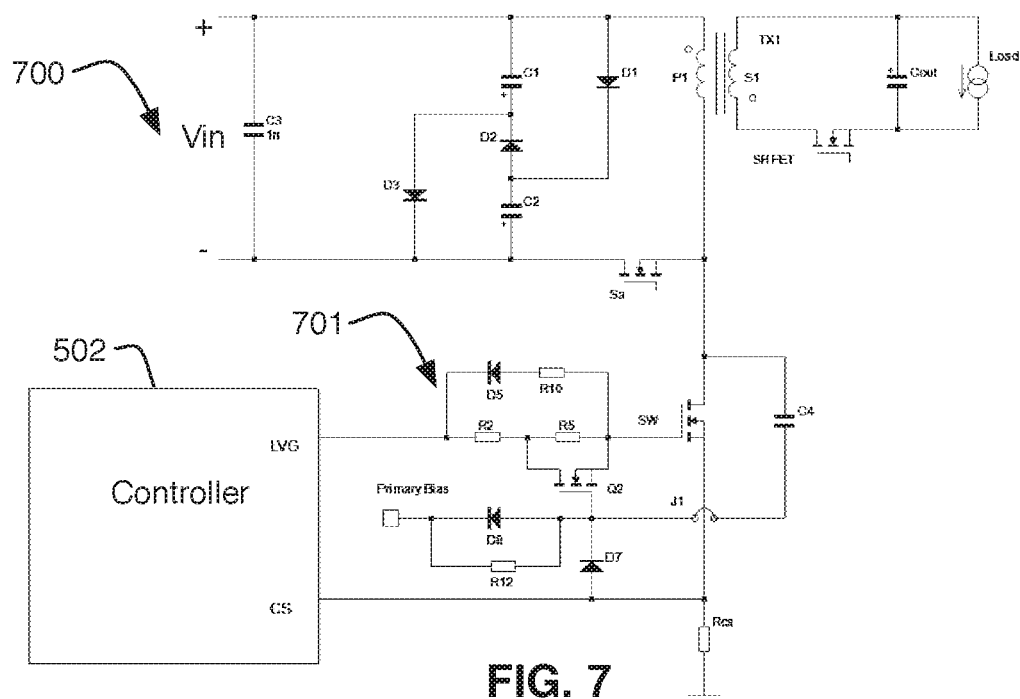
FIG. 7 depicts a converter with an alternative slew rate limiting circuit.
Figure 8:
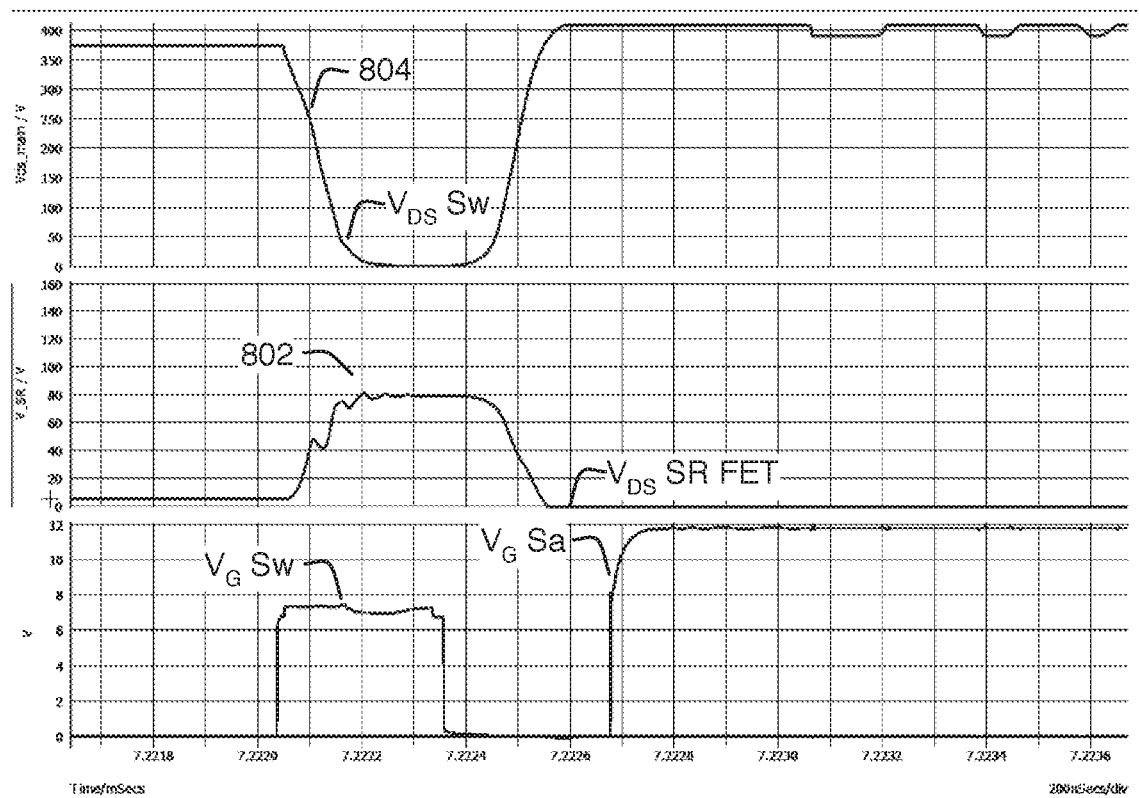
FIG. 8 depicts various waveforms of the converter with the alternative slew rate limiting circuit of FIG. 7.

FIG. 7 illustrates converter 700, which includes an alternative voltage slew rate limiting circuit 701. Voltage slew rate limiting circuit 701 replaces diode D6 with switch Q2 (illustrated as a MOSFET, but which could be any suitable switching device) and resistor R5 to limit the voltage slew rate associated with turn on of main switch Sw. More specifically, resistor R5 may be a relatively high resistance value that in conjunction with the intrinsic Miller capacitance of main switch Sw and capacitor C4 results in a relatively large time constant that extends the time required to turn on main switch Sw. This extended time to turn on main switch Sw can be seen by comparing turn on slope 804 (FIG. 8) with turn on slope 604 (FIG. 6) corresponding to the diode embodiment of FIG. 5. The shallower turn on slope of 804 is indicative of the lower voltage slew rate (dV/dt). A corresponding reduction in the magnitude of the voltage spikes may be seen as between voltage spike 602 (FIG. 6) and voltage spike 802 (FIG. 8).

Operation of voltage slew rate limiting circuit 701 may be understood as follows. When the gate driving signal of main switch Sw is rising during the 1st switching cycle after turn on or waking from burst mode, the drain voltage will decrease simultaneously at a high rate. This high dV/dt turns off switch Q2. As a result resistor R5 is put in series with the gate drive signal. Resistor Rt may have a relatively large resistance value. Together with the input capacitance of the main switch Sw, this large resistance value forms a large time constant to slow down the transition of main switch Sw from the OFF state to ON state. Thus, the slew rate of the drain voltage of main switch Sw (dV/dt) will gradually decrease. As the main switch Sw's drain voltage slowly decreases, the drain voltage of the rectifier SR FET will correspondingly rise slowly. As a result, the high voltage ringing spike is mitigated.

Alternatively, in normal operation when ZVS is available from the clamp circuit, the slew rate of the main switch Sw's drain voltage may be significantly slower. As a result, switch Q2 may be turned on. This selectively bypasses resistor R5 when main switch Sw is operating in normal ZVS mode. With resistor R5 bypassed by switch Q2, the turn on time of main switch Sw is dictated by R2, the inherent Miller capacitance of main switch Sw, and slew rate limiting capacitor C4. With resistor R5 bypassed, this time constant will be lower, and the switching operation may be faster than with resistor R5 in the circuit. Thus, like the diode embodiment discussed above, slew rate limiting circuit 701 operates only when required, which avoids adversely impacts on efficiency or other operational characteristic of the circuit in normal operation.

Both the diode-based slew rate limiting circuit (501) and the switch based slew rate limiting circuit (701) have advantages and disadvantages in various applications. For example, slew rate limiting capacitor may be sized differently in the respective embodiments. In the case of diode-based slew rate limiting circuit 501, the increase in time constant that slows down the turn on transition comes from the increased capacitance provided by capacitor C4. Thus, C4 may need to be relatively larger to provide the desired slew rate. Conversely, in the case of switch-based slew rate limiting circuit 701, a substantial portion of the increase in time constant may be provided by the increased resistance associated with resistor R5. As a result, the capacitance value of capacitor C4 may be reduced in the diode-based embodiment.

Reduced capacitance of capacitor C4 (also provided by the auxiliary winding based embodiment described above) may be advantageous in some embodiments. For example, capacitor C4 presents additional load to the ZVS circuit. Although the energy associated with this increased loading is ultimately recovered, it can cause an undesirable increase in the bias supply voltage depending on the particulars of the circuit design. Alternatively, in some embodiments it may be desirable to have a relatively higher capacitance value for C4. For example, providing additional capacitance across main switch Sw can reduce radiated electromagnetic interference (EMI). In some applications, the higher capacitance value may be desirable to provide further reductions in radiated EMI.

Other advantages/disadvantages of the circuits relate to cost and component sizing. For example, a reduced capacitance value for capacitor C4 may result in a reduced physical size and reduced cost as well. However, switch Q2 may be more expensive (and potentially physically larger) than diode D7. Thus, in any given embodiment, a designer may balance a variety of competing goals and limitations to achieve a circuit meeting the various requirements.

Another consideration arises with respect to switching sequence in transformer-based switching converters that employ high-side and low-side switches. In the illustrated active clamp flyback circuits, main switch Sw may be considered a low side switch, and auxiliary/clamp switch Sa may be considered a high side switch. For a given implementation, it may be desirable to provide a particular start-up sequence when switching is engaged, either at initial turn on or upon waking in burst mode operation. For example, it may be desirable to begin switching with the low side switch first. Alternatively, in some embodiments it may be desirable to begin with the high side switch. The voltage slew rate limiting circuits described herein may be employed in either configuration, and may provide the required degree of voltage slew rate limiting, even if switching begins with the less optimal switch.

Yet another advantage of the circuits described herein is that they provide only the required degree of slew rate limiting, and do not operate when the circuit is otherwise capable of normal operation. As noted with each of the above-described embodiments, triggering of the slew rate limiting circuits is based on a voltage slew rate that is greater than that determined by selection of the various slew rate limiting components, e.g., capacitor C4 (and resistor R5, if provided). If the voltage slew rate is below the threshold determined by these components, the slew rate limiting circuit will not be triggered. Alternatively, if the voltage slew rate is above the threshold determined, the slew rate circuits will intervene to the extent necessary to keep the voltage slew rate to the predetermined limits determined by these components.

Described above are various features and embodiments relating to voltage slew rate limiting circuits for transformer-based switching power supplies. Such circuits may be used in a variety of applications, but may be particularly advantageous when used in conjunction with power supplies and power adapters for electronic devices, including portable electronic devices. Additionally, although numerous specific features and various embodiments have been described, it is to be understood that, unless otherwise noted as being mutually exclusive, the various features and embodiments may be combined in any of the various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A slew rate limiting circuit for a transformer-based switching power converter, the switching power converter having at least one switching device with a first terminal, a second terminal, and a drive terminal, the slew rate limiting circuit comprising:

a capacitor coupled between the first terminal and the drive terminal; and a first diode coupled between the drive terminal and the capacitor, with an anode coupled to the drive terminal of the switching device and a cathode coupled to the capacitor;

wherein the capacitor and the diode selectively limit a voltage slew rate across the first and second terminals of the switching device by changing a time constant of a gate drive circuit of the at least one switching device to increase a turn-on transition time of the at least one switching device.

2. The slew rate limiting circuit of claim 1 wherein the slew rate limiter is configured to selectively operate to limit rate of change of voltage across one or more switching devices of the switching stage during startup of the switching stage.

3. The slew rate limiting circuit of claim 1 wherein the switching stage includes one or more switching devices configured for zero voltage switching in normal operation and wherein the slew rate limiter is configured to selectively operate to limit rate of change of voltage across one or more switching devices of the switching stage when zero voltage switching is unavailable.

4. The slew rate limiting circuit of claim 1 wherein:
the at least one switching device is a MOSFET, the first terminal is a drain of the MOSFET, and the drive terminal is a gate of the MOSFET.

5. The slew rate limiting circuit of claim 1 further comprising a second diode having an anode coupled to the cathode of the first diode and a cathode configured to be coupled to a bias supply of the transformer-based switching power converter.

6. The slew rate limiting circuit of claim 5 further comprising a third diode having an anode coupled to a source of the MOSFET and a cathode coupled to the cathode of the first diode.

7. A power converter comprising:
a transformer having a primary winding and a secondary winding;
a switching stage comprising at least one switching device configured to selectively couple an input voltage of the power converter to the primary winding of the transformer;
a rectifier stage comprising at least one rectifier device configured to couple the secondary winding of the transformer to an output of the power converter; and
a slew rate limiting circuit further comprising:
a capacitor coupled between the first terminal and the drive terminal; and
a first diode coupled between the drive terminal and the capacitor, with an anode coupled to the drive terminal of the switching device and a cathode coupled to the capacitor;
wherein the capacitor and the diode selectively limit a voltage slew rate across the first and second terminals of the switching device by changing a time constant of a gate drive circuit of the at least one switching device to increase a turn-on transition time of the at least one switching device.

8. The power converter of claim 7 wherein the capacitor is a Miller capacitor.

9. The power converter of claim 8 wherein the capacitor is coupled to a gate of the at least one switching device by a diode.

10. A slew rate limiting circuit for a transformer-based switching power converter, the switching power converter having a first switching device with a first terminal, a second terminal, and a drive terminal, the slew rate limiting circuit comprising:
a capacitor configured to be coupled between the first terminal and the drive terminal of the switching device;
a second switching device coupled between the drive terminal and the capacitor, with:
a first terminal of the second switching device coupled to a gate driver of the switching power converter,
a second terminal of the second switching device coupled to the drive terminal of the first switching device, and
a drive terminal of the second switching device coupled to the capacitor;
a resistor coupled between the first and second terminals of the second switching device;
wherein the resistor, capacitor, and the second switching device selectively limit a voltage slew rate across the first and second terminals of the switching device by changing a time constant of a gate drive circuit of the first switching device to increase a turn-on transition time of the first switching device.

11. The slew rate limiting circuit of claim 10 wherein:
the at least one switching device is a MOSFET, the first terminal is a drain of the MOSFET, and the drive terminal is a gate of the MOSFET.

12. The slew rate limiting circuit of claim 10 further comprising a diode having an anode coupled to the drive terminal of the second switching device and a cathode configured to be coupled to a bias supply of the transformer-based switching power converter.

13. The slew rate limiting circuit of claim 12 further comprising a third diode having an anode coupled to a source of the first switching device and a cathode coupled to the drive terminal of the second switching device.

14. The slew rate limiting circuit of claim 10 wherein the slew rate limiting circuit is configured to selectively operate to limit rate of change of voltage across the first switching device during startup of the power converter.

15. The slew rate limiting circuit of claim 10 wherein the power converter includes one or more switching devices configured for zero voltage switching in normal operation and wherein the slew rate limiting circuit is configured to selectively operate to limit rate of change of voltage across the one or more switching devices configured for zero voltage switching in normal operation when zero voltage switching is unavailable.

16. A power converter comprising:
a transformer having a primary winding and a secondary winding;
a switching stage comprising at least one switching device configured to selectively couple an input voltage of the power converter to the primary winding of the transformer;
a rectifier stage comprising at least one rectifier device configured to couple the secondary winding of the transformer to an output of the power converter; and
a slew rate limiting circuit further comprising:
a capacitor configured to be coupled between the first terminal and the drive terminal of the switching device;
a second switching device coupled between the drive terminal and the capacitor, with:
a first terminal of the second switching device coupled to a gate driver of the switching power converter, a second terminal of the second switching device coupled to the drive terminal of the first switching device, and a drive terminal of the second switching device coupled to the capacitor;

a resistor coupled between the first and second terminals of the second switching device;

wherein the resistor, capacitor, and the second switching device selectively limit a voltage slew rate across the first and second terminals of the switching device by changing a time constant of a gate drive circuit of the first switching device to increase a turn-on transition time of the first switching device.

17. The power converter of claim 16 wherein:

the at least one switching device is a MOSFET, the first terminal is a drain of the MOSFET, and the drive terminal is a gate of the MOSFET.

18. The power converter of claim 16 further comprising a diode having an anode coupled to the drive terminal of the second switching device and a cathode configured to be coupled to a bias supply of the transformer-based switching power converter.

19. The power converter of claim 16 further comprising a third diode having an anode coupled to a source of the first switching device and a cathode coupled to the drive terminal of the second switching device.

20. The power converter of claim 16 wherein the slew rate limiting circuit is configured to selectively operate to limit rate of change of voltage across the first switching device during startup of the power converter.

21. The power converter of claim 16 wherein the power converter includes one or more switching devices configured for zero voltage switching in normal operation and wherein the slew rate limiting circuit is configured to selectively operate to limit rate of change of voltage across the one or more switching devices configured for zero voltage switching in normal operation when zero voltage switching is unavailable.

* * * * *